United States Patent

Kashiwagi et al.

[11] Patent Number: 6,034,182
[45] Date of Patent: Mar. 7, 2000

[54] GOLF BALL COVER STOCKS AND GOLF BALLS

[75] Inventors: Shunichi Kashiwagi; Yasushi Ichikawa; Rinya Takesue, all of Chichibu, Japan

[73] Assignee: Bridgestone Sports Co., Ltd, Tokyo, Japan

[21] Appl. No.: 09/132,780

[22] Filed: Aug. 12, 1998

[30] Foreign Application Priority Data

Aug. 14, 1997 [JP] Japan .................................. 9-233332

[51] Int. Cl.[7] ............................. C08L 23/00; C08L 23/04; C08G 63/48; C08G 63/91; C08F 8/00
[52] U.S. Cl. ........................ 525/240; 473/351; 473/378; 525/74; 525/78; 525/196; 525/227; 525/228
[58] Field of Search ................................ 525/74, 78, 196, 525/227, 228, 240; 473/351, 378

[56] References Cited

U.S. PATENT DOCUMENTS 4,567,219  1/1986  Tominaga et al. ..................... 524/413
5,869,578  2/1999  Rajagopalan ......................... 525/330.2

FOREIGN PATENT DOCUMENTS 60-14879   1/1985  Japan .
60-145160  7/1985  Japan .
9-140831   6/1997  Japan .

Primary Examiner—Patrick D. Niland
Attorney, Agent, or Firm—Sughrue, Mion, Zinn, Macpeak & Seas, PLLC

[57] ABSTRACT

In a resin blend consisting essentially of (A) 90–10% by weight of an ionomer resin and (B) 10–90% by weight of a copolymer of ethylene and an α-olefin of at least 4 carbon atoms having a specific gravity of 0.86–0.92 and a dispersity (Mw/Mn) of up to 2.5, (C) a polyolefin having a polar group is blended in an amount of 0.5–20 parts by weight per 100 parts by weight of (A)+(B), yielding a cover stock for golf balls. Golf balls with a cover formed of this cover stock are improved in durability, impact resistance, flight performance, hitting feel and controllability.

6 Claims, No Drawings

GOLF BALL COVER STOCKS AND GOLF BALLS

BACKGROUND OF THE INVENTION

1. Field of the Invention

This invention relates to a cover stock for golf balls and golf balls having a cover of the cover stock.

2. Prior Art

Ionomer resins, which are metal ion-crosslinked products of ethylene-α,β-unsaturated carboxylic acid copolymers, are often used as the cover stock for two-piece golf balls and wound golf balls because of their resilience, impact durability, and cut resistance. Since the ionomer resins, however, have a higher hardness than balata rubber which is well known as the cover stock in the golf ball art, the ionomer covered golf balls give an unpleasant feel when hit and are less controllable because of difficulty to impart an appropriate spin on iron shots.

One cover stock proposed to solve this problem is a blend of an ionomer resin having a very low hardness, that is, a metal ion-crosslinked product of an ethylene-α,β-unsaturated carboxylic acid-unsaturated carboxylate terpolymer with a metal ion-crosslinked product of an ethylene-α,β-unsaturated carboxylic acid copolymer. Using this cover stock, golf balls having a relatively soft cover, a good feel when hit, and ease of control are obtainable. This cover stock, however, is insufficient in flight distance because the metal ion-crosslinked product of an ethylene-α,β-unsaturated carboxylic acid-unsaturated carboxylate terpolymer is less resilient, and blending with the metal ion-crosslinked product of an ethylene-α,β-unsaturated carboxylic acid copolymer cannot compensate for this loss.

JP-A 14879/1985 and 145160/1985 propose to use blends of an ionomer resin and polyethylene as the cover stock. Since the ionomer resin is less compatible with polyethylene, these blends lack the uniformity of dispersion and hence, durability. Because of the relatively high hardness of polyethylene, the balls do not necessarily give a satisfactory feel when hit.

JP-A 140831/1997 discloses a golf ball-forming stock material comprising a metallocene-catalyzed polyolefin alone or in admixture with an ionomer resin. In the former case, the feel and resilience of golf balls are not fully satisfactory. In the latter case, the feel and resilience of golf balls are improved, but the stock material sometimes lacks uniformity of dispersion and hence, durability due to the low compatibility between the metallocene-catalyzed polyolefin and the ionomer resin.

SUMMARY OF THE INVENTION

An object of the present invention is to provide a cover stock having such improved properties that golf balls covered therewith are improved in durability, impact resistance, flight performance, hitting feel and controllability. Another object of the present invention is to provide a golf ball having a cover formed of the cover stock.

We have found that when a blend of (A) an ionomer resin, (B) a copolymer of ethylene with an alpha-olefin of at least 4 carbon atoms having a specific gravity of 0.86 to 0.92 and a dispersity (Mw/Mn) of up to 2.5, and (C) a polyolefin having a polar group is used as the cover stock from which covers of two- or multi-piece solid golf balls and wound golf balls are formed, there can be obtained golf balls which are improved in durability, impact resistance, flight performance, hitting feel and controllability.

When copolymer (B) contains a selected amount of butene, hexene, octene, decene or a mixture thereof as the alpha-olefin and/or when copolymer (B) has been prepared by copolymerizing ethylene with the alpha-olefin In the presence of a metallocene-containing catalyst, the balls are further improved in hitting feel, controllability and flight performance. These effects are augmented particularly when the metallocene-catalyzed polyolefin having higher resilience is blended with the ionomer resin.

Blending of the polyolefin having a polar group, especially an acid-modified polyolefin or an epoxy group-containing polyolefin as component (C) is effective for improving the uniformity of dispersion between the polar group-containing ionomer resin (A) and the polar group-free copolymer (B) and hence, preventing lowering of the durability and impact resistance characteristic of the ionomer resin (A).

Accordingly, the present invention provides a cover stock for golf balls comprising 100 parts by weight of a resin blend consisting essentially of (A) 90 to 10% by weight of an ionomer resin and (B) 10 to 90% by weight of a copolymer of ethylene and an alpha-olefin of at least 4 carbon atoms having a specific gravity of 0.86 to 0.92 and a dispersity of up to 2.5, and (C) 0.5 to 20 parts by weight of a polyolefin having a polar group.

In one preferred embodiment, the alpha-olefin of at least 4 carbon atoms in component (B) is at least one member selected from the group consisting of butene, hexene, octene and decene, and the copolymer has 0.5 to 28% by weight of the alpha-olefin copolymerized with ethylene. In another preferred embodiment, component (B) is a copolymer which has been prepared by copolymerizing ethylene with the alpha-olefin in the presence of a metallocene-containing catalyst. In a further preferred embodiment, component (C) is an acid-modified polyolefin or an epoxy group-containing polyolefin.

Also contemplated herein is a golf ball comprising a cover formed of the cover stock defined above.

DETAILED DESCRIPTION OF THE INVENTION

Briefly stated, the cover stock for golf balls according to the invention is a blend of (A) an ionomer resin, (B) a copolymer of ethylene with an alpha-olefin of at least 4 carbon atoms having a specific gravity of 0.86 to 0.92 and a dispersity (Mw/Mn) of up to 2.5, and (C) a polyolefin having a polar group.

The ionomer resin used as component (A) includes resins in which carboxyl groups of ethylene-α,β-unsaturated carboxylic acid copolymers or ethylene-α,β-unsaturated carboxylic acid-unsaturated carboxylate terpolymers are partially neutralized with metal ions such as Na, Li, K, Zn and Mg ions. These resins may be used alone or in admixture of two or more.

Of the ionomer resins, those resins having a Shore D hardness of 40 to 70, especially 50 to 65 are preferable. An ionomer resin with a Shore D hardness of less than 40 would lead to a relatively softer cover which is insufficient for distance. An ionomer resin with a Shore D hardness of more than 70 would lead to a relatively harder cover which can adversely affect the feel and control of balls when hit. These ionomer resins may be selected from commercially available ones, for example, Surlyn 8120, 8320, 1605, 1706, and 1707 from E.I. duPont and Himilan 1605, 1706, 1557 and 1855 from Mitsui-duPont Polychemicals K.K.

Component (B) is a copolymer of ethylene with an alpha-olefin having at least 4 carbon atoms.

The alpha-olefin having at least 4 carbon atoms includes butene, hexene, octene, and decene. Preferably ethylene is copolymerized with an alpha-olefin such that the copolymer may contain 0.5 to 28% by weight, especially 10 to 25% by weight of the alpha-olefin. Copolymers containing less than 0.5% by weight of the alpha-olefin would be less elastic whereas copolymers containing more than 28% by weight of the alpha-olefin would be too soft.

Copolymerization of ethylene with an alpha-olefin is preferably carried out in the presence of a catalyst containing a metallocene in order to produce a copolymer having a specific gravity of 0.86 to 0.92 and a narrow dispersity (Mw/Mn) of up to 2.5. Examples of the metallocene-containing catalyst include metallocene/alumoxane catalysts and metallocene/organo-metallic catalysts.

The copolymer should have a specific gravity of 0.86 to 0.92 and a dispersity (Mw/Mn), which is defined as a weight average molecular weight divided by a number average molecular weight, of up to 2.5. Preferably the copolymer has a Shore D hardness of 10 to 50, especially 15 to 45. A copolymer with a Shore D hardness of less than 10 would fail to produce a cover with an appropriate feel and control. A copolymer with a Shore D hardness of more than 50 would also fail to produce a cover with an appropriate feel and control and detract from flight performance.

These copolymers are commercially available under the trade name of Engage EG8200, 8150, 8100 and Affinity FM1570 and FW1650 both from Dow Chemical, and Exact E-3036, E-4033, E-4041, E-4042, E-4049 and E-5008 from Exxon Chemical.

Component (C) is a polyolefin having a polar group, typically an acid-modified polyolefin or an epoxy group-containing polyolefin.

As to the acid-modified polyolefins, the acids used therein are maleic acid, maleic anhydride, etc. and the olefin components include ethylene, propylene, butene, hexene, and octene, with ethylene and propylene being preferred. In maleic anhydride-modified olefin copolymers, any component other than the maleic anhydride and olefin may be added as a comonomer for the purpose of softening or the like. Such comonomers include methyl acrylate, ethyl acrylate, butyl acrylate, methyl methacrylate, ethyl methacrylate, butyl methacrylate, and vinyl acetate, with the acrylates and methacrylates being especially preferred. These acid-modified polyolefins are commercially available under the trade name of Umex 2000 and 1010 from Sanyo Chemical Industry K.K. and Bondyne AX8390 from Sumitomo Chemical Industry K.K.

In the epoxy group-containing polyolefins, the same olefins as in the acid-modified polyolefins may be used, with ethylene being especially preferred. The epoxy groups are preferably incorporated using glycidyl methacrylate, glycidyl acrylate or the like. Also in the epoxy group-containing polyolefins, any component other than the glycidyl and olefin components, for example, acrylates, methacrylates and vinyl acetate may be added for the purpose of adjusting flow and hardness.

Examples of the epoxy group-containing polyolefins include ethylene/glycidyl (meth)acrylate, ethylene/n-butyl acrylate/glycidyl (meth)acrylate, ethylene/methyl acrylate/glycidyl (meth)acrylate, ethylene/acrylate/glycidyl (meth) acrylate, and ethylene/glycidyl (meth)acrylate/vinyl acetate copolymers. They are commercially available under the trade name of Elvalloy AS and EP4934-6 from Mitsui-duPont Polychemicals K.K., for example.

A blend of the acid-modified polyolefin and the epoxy group-containing polyolefin is also useful as component (C).

The cover stock of the invention contains components (A) to (C) as essential components. Appropriates amounts of these components are such that 90 to 10% by weight, especially 80 to 30% by weight of component (A) is blended with 10 to 90% by weight, especially 20 to 70% by weight of component (B) to form a resin blend, and 0.5 to 20 parts by weight, especially 0.5 to 10 parts by weight of component (C) is added to 100 parts by weight of the resin blend, that is, (A)+(B). If the content of component (A) is more than 90% by weight and the content of component (B) is less than 10% by weight, the softening effect by component (B) becomes insufficient, resulting in hard feel and poor control. If the content of component (A) is less than 10% by weight and the content of component (B) is more than 90% by weight, the cover stock fails to take advantage of the resilience inherent to component (A), leading to a loss of distance. Less than 0.5 part by weight of component (C) per 100 parts by weight of the resin blend is ineffective for assisting in the uniform dispersion of components (A) and (B), giving rise to problems of durability and impact resistance. A composition with more than 20 parts by weight of component (C) becomes low in resilience, leading to a loss of distance. Particularly when the epoxy group-containing polyolefin is used as component (C), a composition with more than 20 parts by weight of component (C) becomes less flowing and difficult to mold.

In the cover stock of the invention wherein the above-described essential components are blended in the selected amounts, various additives may be added if necessary. Useful additives include dyestuffs, pigments such as titanium dioxide, zinc oxide and barium sulfate, UV absorbers, antioxidants, and dispersants such as metal soaps.

The cover stock of the invention may be prepared by blending the selected amounts of components (A) to (C) and optionally various additives in a conventional manner. For example, the ingredients are admitted into a closed kneading machine (e.g., Banbury mixer and kneader) or extruder where they are mixed.

According to the invention, golf balls are prepared by enclosing a core with a cover which is formed from the above-described cover stock. The core used may be any of solid cores, multiple cores and wound cores. More illustratively, included are solid cores formed by integral molding of a rubber composition followed by vulcanization or crosslinking, multiple cores comprising a solid core and at least one layer of thermoplastic elastomer, and wound cores comprising a solid or liquid center and thread rubber winding.

In the practice of the invention, the cover may be formed on the core by well-known methods, for example, an injection molding method involving placing the core in an injection mold and injecting the cover stock into the mold cavity, and a compression molding method involving pre-forming a pair of hemispherical half cups from the cover stock, enclosing the core in the pair of half cups, and effecting compression molding. The cover may be a single layer or a multilayer structure including two or more layers. In the case of the multilayer structure cover, it suffices that at least one of the cover layers is formed of the inventive cover stock. For example, in the case of a two layer cover, it is possible that the cover inner layer be formed of a well-known cover stock such as thermoplastic elastomer or ionomer resin and only the cover outer layer where dimples are indented be formed of the inventive cover stock.

The golf balls of the invention are suited for use in tournaments and must have a diameter and weight in accordance with the Rules of Golf, specifically a diameter of not less than 42.67 mm and a weight of not greater than 45.93 g.

There has been described a golf ball cover stock consisting essentially of components (A), (B) and (C) and having improved properties. Golf balls with a cover formed of the cover stock have excellent durability, impact resistance, flight performance and are improved in feel and control when hit.

EXAMPLE

Examples of the present invention are given below by way of illustration and not by way of limitation. All parts are by weight.

Examples 1–5 & Comparative Examples 1–6

Solid cores were formed using a core composition shown in Table 1.

Covers were formed around the solid cores, obtaining golf balls. In the golf balls of Examples 1–3 and Comparative Examples 1–6, the cover layers shown in Tables 1 and 2 were formed to a gage of 2.1 mm. In the golf balls of Example 4, the first inner layer was formed to a gage of 1.8 mm and the cover layer was formed thereon to a gage of 2.1 mm. In the golf balls of Example 5, the first inner layer was formed to a gage of 1.3 mm, the second inner layer was formed thereon to a gage of 1.5 mm, and the cover layer was further formed thereon to a gage of 1.8 mm.

TABLE 1

| (Parts by weight) | Examples 1–3 and Comparative Examples 1–6 | Example 4 | Example 5 |
| --- | --- | --- | --- |
| Polybutadeene rubber* | 100 | 100 | 100 |
| Zinc acrylate | 27 | 25 | 23 |
| Zinc oxide | 10 | 27 | 37 |
| Barium sulfate | 12.5 | 0 | 0 |
| Dicumyl peroxide | 0.9 | 0.8 | 0.8 |
| Core diameter | 38.5 mm | 35 mm | 33.5 mm |
| Core weight | 35.3 g | 27.6 g | 22.7 g |
| Cover gage 1 | 2.1 mm | 1.8 mm | 1.3 mm |
| Cover gage 2 | — | 2.1 mm | 1.5 mm |
| Cover gage 3 | — | — | 1.8 mm |

*BR01 by Nippon Synthetic Rubber K.K.

The thus obtained golf balls having a diameter of 42.8 mm and a weight of 45.2 g were examined by the following tests. The results are shown in Tables 2 and 3.

Hardness

A deflection (mm) of the ball under an applied load of 100 kg.

Initial Velocity

Using a swing robot, the ball was hit with a driver at a head speed of 45 m/s (#W1/HS45). An initial velocity was measured on an apparatus as approved by R&A or USGA.

Flight Performance

Using a swing robot, the ball was hit with a driver at a head speed of 45 m/s (#W1/HS45). A carry and total distance were measured.

Feel

The balls were driven by three professional golfers with a driver (#W1), who rated each ball according to the following criteria.

OO: very good

O: good

X: bad

Durability

Using an endurance swing robot, the ball was hit with a driver (#W1) at a head speed of 40 m/sec. The hitting step was repeated until the ball was broken, but to a maximum of 300 hits. The ball was rated as follows in accordance with the number of hits upon ball breakage.

O: not broken until 300 hits

Δ: not broken until 200 hits, but broken within 300 hits

X: broken within 100 hits

TABLE 2

| | | Example | | | | |
| --- | --- | --- | --- | --- | --- | --- |
| Cover composition (pbw) | | 1 | 2 | 3 | 4 | 5 |
| First inner layer | Himilan 1706 | — | — | — | 50 | 50 |
| | Himilan 1605 | — | — | — | 50 | 50 |
| Second inner layer | Hytrel 3078 | — | — | — | — | 100 |
| Cover layer | Himilan 1706 | 35 | 35 | 35 | 35 | 35 |
| | Himilan 1605 | 35 | 35 | 35 | 35 | 35 |
| | Engage EG8200 | 30 | 30 | 30 | 30 | 30 |
| | Ultzex 30200J | — | — | — | — | — |
| | Elvalloy AS | — | — | 5 | — | — |
| | Umex 2000 | 5 | 2 | — | 5 | 5 |
| Performance | Hardness (mm) | 2.6 | 2.6 | 2.5 | 2.5 | 2.9 |
| | Initial Velocity (m/s) | 77.1 | 77.3 | 77.2 | 77.2 | 77.1 |
| | Flight distance (m) Carry | 210 | 210.5 | 210 | 210 | 210 |
| | Total (m) | 222 | 223 | 222.5 | 219 | 219.5 |
| | Feel | OO | OO | OO | O | O |
| | Durability | O | O | O | O | O |

Note:
Himilan 1706: Zn-neutralized binary ionomer by Mitsui-duPont Polychemicals K.K.
Himilan 1605: Na-neutralized binary ionomer by Mitsui-duPont Polychemicals K.K.
Hytrel 3078: thermoplastic polyester elastomer by Toray-duPont K.K.
Engage EG8200: metallocene-catalyzed polyolefin, ethylene-octene copolymer (Mw/Mn = 2, specific gravity = 0.870) by Dow Chemical
Ultzex 30200J: polyethylene by Mitsui Petro-Chemical K.K.
Elvalloy AS: ethylene-acrylate-glycidyl methacrylate random terpolymer by Mitsui-duPont Polychemicals K.K.
Umex 2000: maleic anhydride-modified polyethylene by Sanyo Chemical K.K.

TABLE 3

| | | Comparative Example | | | | | |
| --- | --- | --- | --- | --- | --- | --- | --- |
| Cover composition (pbw) | | 1 | 2 | 3 | 4 | 5 | 6 |
| First inner layer | Himilan 1706 | — | — | — | — | — | — |
| | Himilan 1605 | — | — | — | — | — | — |
| Second inner layer | Hytrel 3078 | — | — | — | — | — | — |
| Cover layer | Himilan 1706 | 50 | 46 | 35 | 35 | 35 | 35 |
| | Himilan 1605 | 50 | 46 | 35 | 35 | 35 | 35 |
| | Engage EG8200 | — | — | — | 30 | 30 | 30 |
| | Ultzex 30200J | — | 8 | 30 | — | — | — |
| | Elvalloy AS | — | — | — | — | — | — |
| | Umex 2000 | — | — | — | — | 0.02 | 25 |
| Performance | Hardness (mm) | 2.2 | 2.2 | 2.2 | 2.5 | 2.6 | 2.7 |
| | Initial Velocity (m/s) | 77.4 | 77.3 | 76.5 | 77.3 | 77.2 | 76.7 |
| | Flight distance (m) Carry | 211 | 211 | 205.5 | 210 | 210 | 207 |
| | Total (m) | 223 | 222.5 | 212.5 | 218 | 218.5 | 217 |
| | Feel | X | X | X | O | OO | OO |
| | Durability | O | O | X | X | X | Δ |

It is evident from Tables 2 and 3 that the golf balls within the scope of the invention are satisfactory in all of resilience, flight distance, feel and durability. As seen from Examples 4 and 5, golf balls having a multilayer structure cover in which one layer is formed of the inventive cover stock are also satisfactory in all such properties.

In contrast, the golf balls of Comparative Example 1 having an ionomer cover similar to prior art golf balls, and the golf balls of Comparative Examples 2 and 3 wherein the cover is formed of a blend of an ionomer resin and polyethylene are inferior in feel when hit. The golf balls of Comparative Example 4 having a cover of components (A) and (B), but free of component (C) are less durable. The golf balls of Comparative Examples 5 and 6 wherein the cover is formed of a cover stock consisting of components (A) to (C), but the content of component (C) is outside the range of the invention are short in distance and unsatisfactory in durability.

Japanese Patent Application No. 233332/1997 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A cover stock for golf balls comprising 100 parts by weight of a resin blend consisting essentially of (A) 90 to 10% by weight of an ionomer resin having a Shore D hardness of 50 to 65 and (B) 10 to 90% by weight of a copolymer of ethylene and an alpha-olefin of at least 4 carbon atoms having a specific gravity of 0.86 to 0.92 and a dispersity of up to 2.5 and a Shore D hardness of 15 to 45, and (C) 0.5 to 20 parts by weight of a polyolefin having a polar group.

2. The cover stock of claim 1 wherein in component (B), the alpha-olefin of at least 4 carbon atoms is at least one member selected from the group consisting of butene, hexene, octene and decene, and the copolymer has 0.5 to 28% by weight of the alpha-olefin copolymerized with ethylene.

3. The cover stock of claim 1 wherein component (B) is a copolymer which has been prepared by copolymerizing ethylene with the alpha-olefin in the presence of a metallocene-containing catalyst.

4. The cover stock of claim 1 wherein component (C) is an acid-modified polyolefin or an epoxy group-containing polyolefin.

5. A golf ball comprising a cover formed of the cover stock of claim 1.

6. The cover stock of claim 1 wherein component (C) is an acid-modified polyolefin in which the acid is maleic acid or maleic anhydride and the olefin component is ethylene, propylene, butene, hexene or octene.

* * * * *